UNITED STATES PATENT OFFICE.

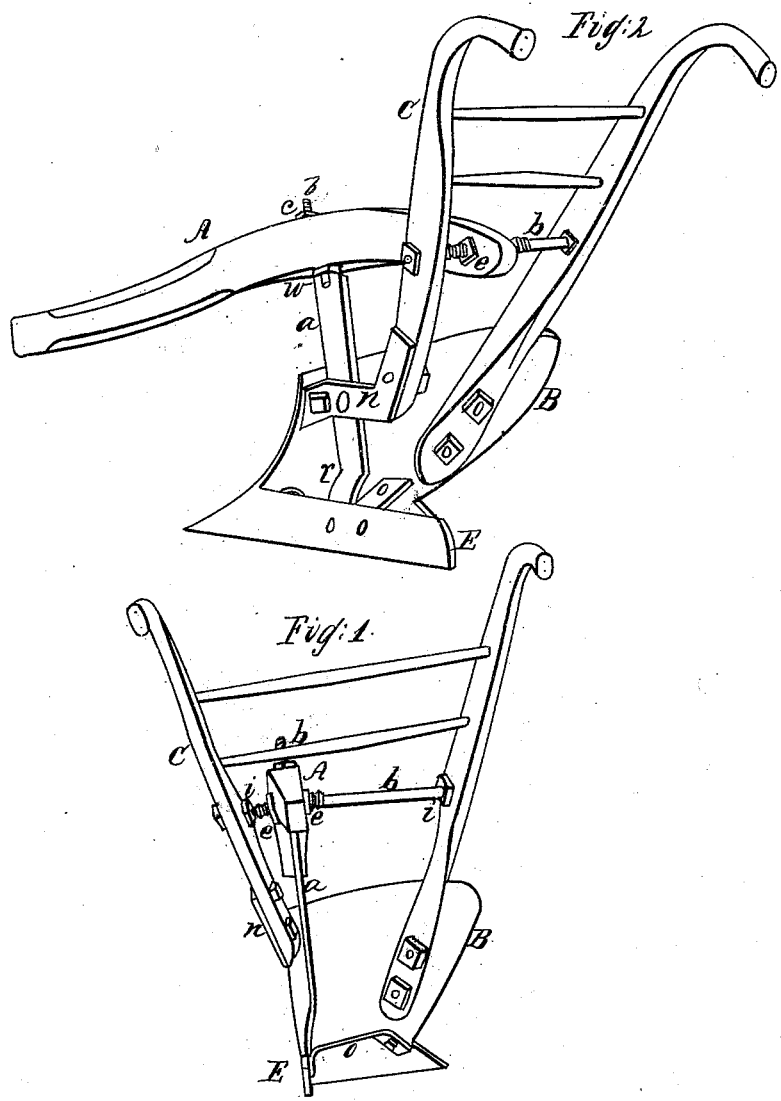
A. W. Stoker,
Plow.
No. 57,991. Patented Sep. 11, 1866.
Witnesses
P. T. Dodge
G. B. Holden
Inventor
A. W. Stoker
By his atty
M. Dodge

A. W. STOKER, OF PETERSBURG, ILLINOIS.

IMPROVEMENT IN PLOWS.

Specification forming part of Letters Patent No. 57,991, dated September 11, 1866.

*To all whom it may concern:*

Be it known that I, A. W. STOKER, of Petersburg, in the county of Menard and State of Illinois, have invented certain new and useful Improvements in Plows; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in providing means for adjusting the beam both vertically and laterally, and also in a novel manner of arranging the standard and the attachments of the handle on the land-side, whereby it is prevented from becoming clogged with weeds or similar trash.

Figure 1 is a rear elevation, and Fig. 2 a perspective view, of the plow.

It is necessary, in order to have a plow that will work successfully in various conditions of the soil, to so arrange it that the beam can be readily adjusted vertically, to cause the plow to run more or less deep, and also to adjust it laterally to regulate the width of the furrow cut.

To accomplish these objects I forge the upper end of the standard $a$ round like a bolt, as shown at $l$, Fig. 2, and pass it through the beam, as there shown. A screw-thread is cut thereon, and a nut, $u$, placed on it below the beam, and another nut, $c$, is screwed on above the beam.

A rod, $b$, extends across from one to the other of the handles, passing through the rear end of the beam, as shown; and on this rod a nut, $e$, is placed on each side of the beam, as shown in Fig. 1.

By simply turning the nuts $c$ and $u$ on the standard up or down, the beam may be raised or lowered at will; and by screwing the nuts $e$ on the rod $b$ to the right or left, the beam may be adjusted so as to throw the plow to or from the land, as desired.

By means of the nuts $i$ the rod and handles are held securely in place, and prevented from becoming loose.

The standard $a$, instead of passing straight down by the land-side E, as is usual, is set in away from the land-side of the plow, as shown, and is curved at $r$, Fig. 2, so as to reach out to the land-side at the bottom, to which it is secured by a bolt or rivet.

A brace, $o$, extends across from the land-side to the mold-board B, and prevents them from being pressed inward by the pressure of the earth upon them.

The handle C, instead of extending down and being attached to the land-side E, reaches but a little way below the top of the mold-board, and has its lower end bolted to a plate or brace, $n$, which extends forward, and is bolted to the standard $a$, and at its front end to the front of the mold-board, as shown in Fig. 2.

By this means the standard $a$ is set in some distance from the land-side of the plow, and all in rear of the standard is left open, so that any weeds, sticks, or trash of any kind that may chance to work or fall in on the land-side, will pass off at its rear and fall into the furrow, where it will be covered at the next round.

In this manner I produce a plow readily adjusted, as desired, by simply turning the nuts, and that will plow without becoming clogged with weeds or similar substances.

I do not claim as my invention the pivoting of the beam on the standard, nor the lateral adjustment of the beam in and of itself, as I am aware that these features have before been used separately in plows; but

Having thus described my invention, what I claim is—

1. A plow having its beam A pivoted and adjusted upon the standard $a$, as shown, and also having its rear end secured and adjusted upon the rod $b$, in the manner herein set forth.

2. In combination with the standard $a$, set in from the land-side, as shown, securing the handle C to the elbow iron, or brace $n$, when arranged as shown and described.

A. W. STOKER.

Witnesses:
DANIEL KYLE,
BENJAMIN SMITH.